United States Patent [19]
Whittaker

[11] Patent Number: 6,070,233
[45] Date of Patent: May 30, 2000

[54] PROCESSOR BUS TRAFFIC OPTIMIZATION SYSTEM FOR MULTI-LEVEL CACHE UTILIZING REFLECTION STATUS BIT TO INDICATE DATA INCLUSION IN HIGHER LEVEL CACHE

[75] Inventor: Bruce Ernest Whittaker, Mission Viejo, Calif.

[73] Assignee: Unisys Corporation, Blue Bell, Pa.

[21] Appl. No.: 08/931,329

[22] Filed: Sep. 16, 1997

Related U.S. Application Data

[63] Continuation of application No. 08/592,093, Jan. 26, 1996, abandoned.

[51] Int. Cl.[7] .................................................. G06F 13/14
[52] U.S. Cl. .......................... 711/144; 711/146; 711/141
[58] Field of Search ...................................... 711/122, 146, 711/144, 141, 145, 3, 134

[56] References Cited

U.S. PATENT DOCUMENTS

| | | | |
|---|---|---|---|
| 5,058,006 | 10/1991 | Durdan et al. ......................... | 395/449 |
| 5,136,700 | 8/1992 | Thacker ................................ | 395/449 |
| 5,197,139 | 3/1993 | Emma et al. .......................... | 395/417 |
| 5,249,284 | 9/1993 | Kass et al. ............................. | 395/468 |
| 5,369,753 | 11/1994 | Tipley ................................... | 395/449 |
| 5,530,832 | 6/1996 | So et al. ................................ | 395/449 |
| 5,551,001 | 8/1996 | Cohen ................................... | 711/122 |
| 5,564,035 | 10/1996 | Lai ....................................... | 395/471 |
| 5,577,227 | 11/1996 | Finnell ................................. | 711/122 |
| 5,584,013 | 12/1996 | Cheong et al. ....................... | 395/449 |
| 5,584,014 | 12/1996 | Nayfeh ................................. | 711/134 |
| 5,729,712 | 3/1998 | Whitaker ............................. | 711/122 |

OTHER PUBLICATIONS

"Extended L2 Directory for L1 Residence Recording", IBM Technical Disclosure Bulletin, vol. 34, No. 8, p. 130–133, Jan. 1992.

*Primary Examiner*—John W. Cabeca
*Assistant Examiner*—Christopher S. Chow
*Attorney, Agent, or Firm*—Alfred W. Kozak; Mark T. Starr; Steven R. Petersen

[57] ABSTRACT

A small first level cache and large second level cache support a central processor in accessing necessary data for processing. The second level cache holds tag address words each having two status bits V and R. The V bit indicates validity/invalidity status while the R bit informs the second level cache of the validity/invalidity status of the corresponding address in the first level cache. As a result of the status information between the two caches, the spy-snoop operation and invalidation operation cycles are minimized as to the use required of the processor bus, enabling higher efficiency processor operations.

2 Claims, 9 Drawing Sheets

S1. SIMPLE 1st-LEVEL FILL
FROM 2nd-LEVEL HIT

FIG. 6A

S2. SIMPLE 1st-LEVEL FILL
AND 2nd-LEVEL FILL
FROM MEMORY

S3. 1st-LEVEL OVER-FILL WITH LRUTAG TO 2nd-LEVEL

FIG. 7B

S4. 2nd-LEVEL OVER-FILL WITH ADDRESS TRANSFER TO 1st-LEVEL

S5. INVALIDATE
2nd-LEVEL
-RBIT OFF

FIG. 8A

BEFORE

INVALIDATION
ADDRESS "B"
FROM SNOOP
LOGIC

AFTER

S6. INVALIDATE 2nd-LEVEL
WITH ADDRESS TRANSFER
TO 1st-LEVEL

FIG. 8B

BEFORE

ADDRESS "B"
TRANSFERED FOR
INVALIDATION

INVALIDATION
ADDRESS "B"
FROM SNOOP
LOGIC

AFTER

PROCESSOR BUS TRAFFIC OPTIMIZATION SYSTEM FOR MULTI-LEVEL CACHE UTILIZING REFLECTION STATUS BIT TO INDICATE DATA INCLUSION IN HIGHER LEVEL CACHE

This is a continuation of application Ser. No. 08/592,093 filed on Jan. 26, 1996, now abandoned.

FIELD OF THE INVENTION

This disclosure refers to circuitry and methods for increasing processor efficiency by reducing traffic on the processor bus to the cache in invalidation cycles.

BACKGROUND OF THE INVENTION

Figure 3A:
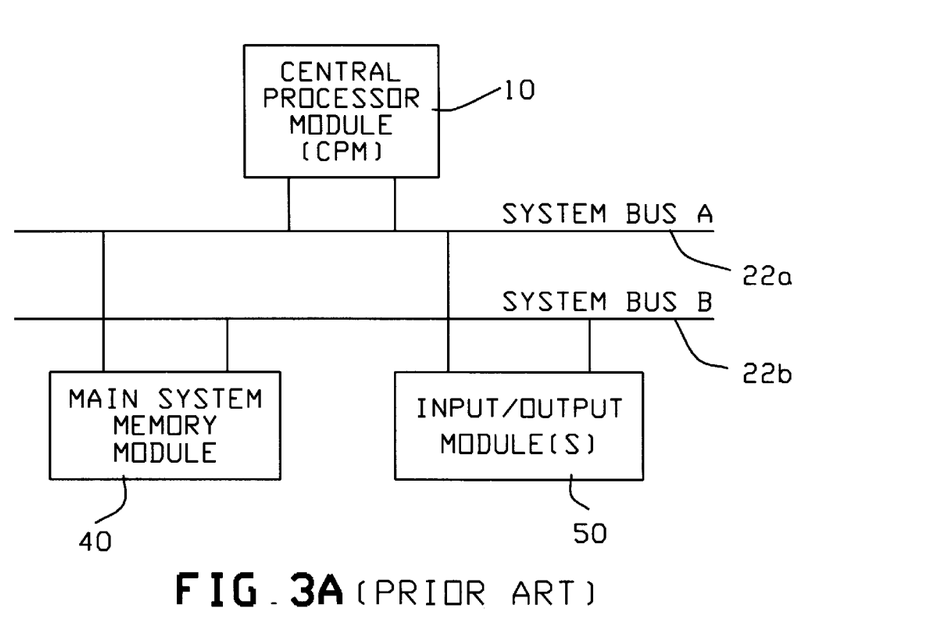
FIG. 3A is a basic network drawing of a computer system using dual system busses.

FIG. 3A illustrates a basic picture of a computing system which includes a Central Processing Module 10, an Input/Output Module or Modules 50, and a Main System Memory Module 40 all interconnected by dual redundant system busses 22a and 22b. This configuration might be considered typical of a general computer system.

Figure 3B:
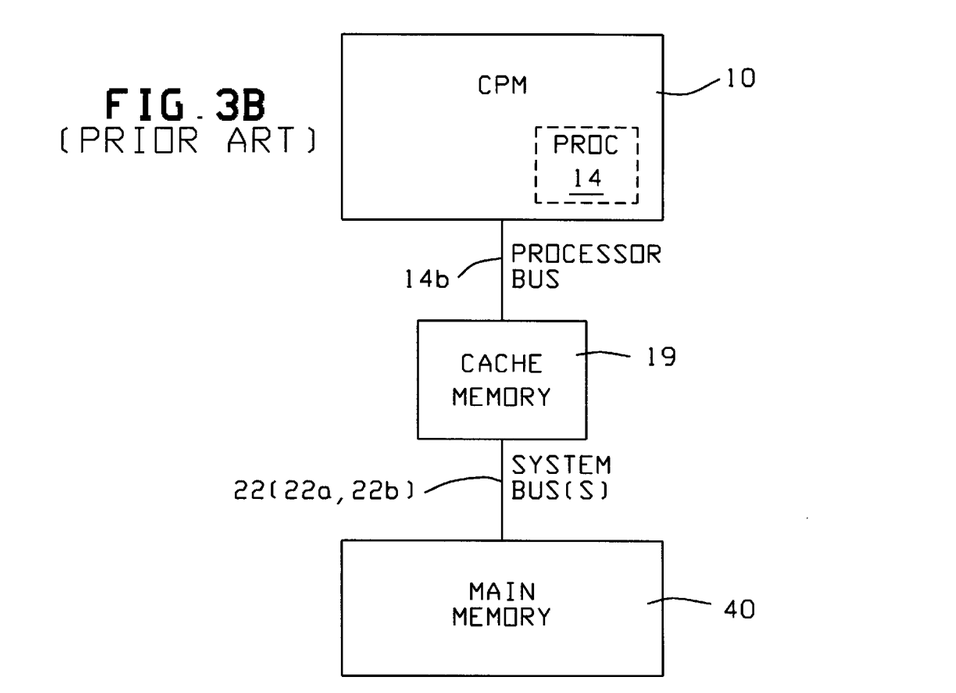
FIG. 3B shows a computer network having a cache memory added to the Central Processing Module.

FIG. 3B is an illustration of the Central Processing Module (CPM) pathway with a cache memory module 19 added in order to enhance system performance. Whenever the processor 14 needs data from main memory 40, the cache memory unit 19 is the first line of resource for this data. An efficient cache design will, on average, contain the requested processor information about 90% of the time. If the cache memory 19 does not have the required information in its latest, most valid state, then the data must be accessed from the system Main Memory 40 over some system bus mechanism such as the processor bus 14b and the dual redundant system busses 22a, 22b. In this latter situation requiring main memory access, this, of course, involves a longer period of time and thus slows down the processor operation than if the processor were able to immediately retrieve the requested data from the cache memory 19 via the processor bus 14b.

Figure 3C:
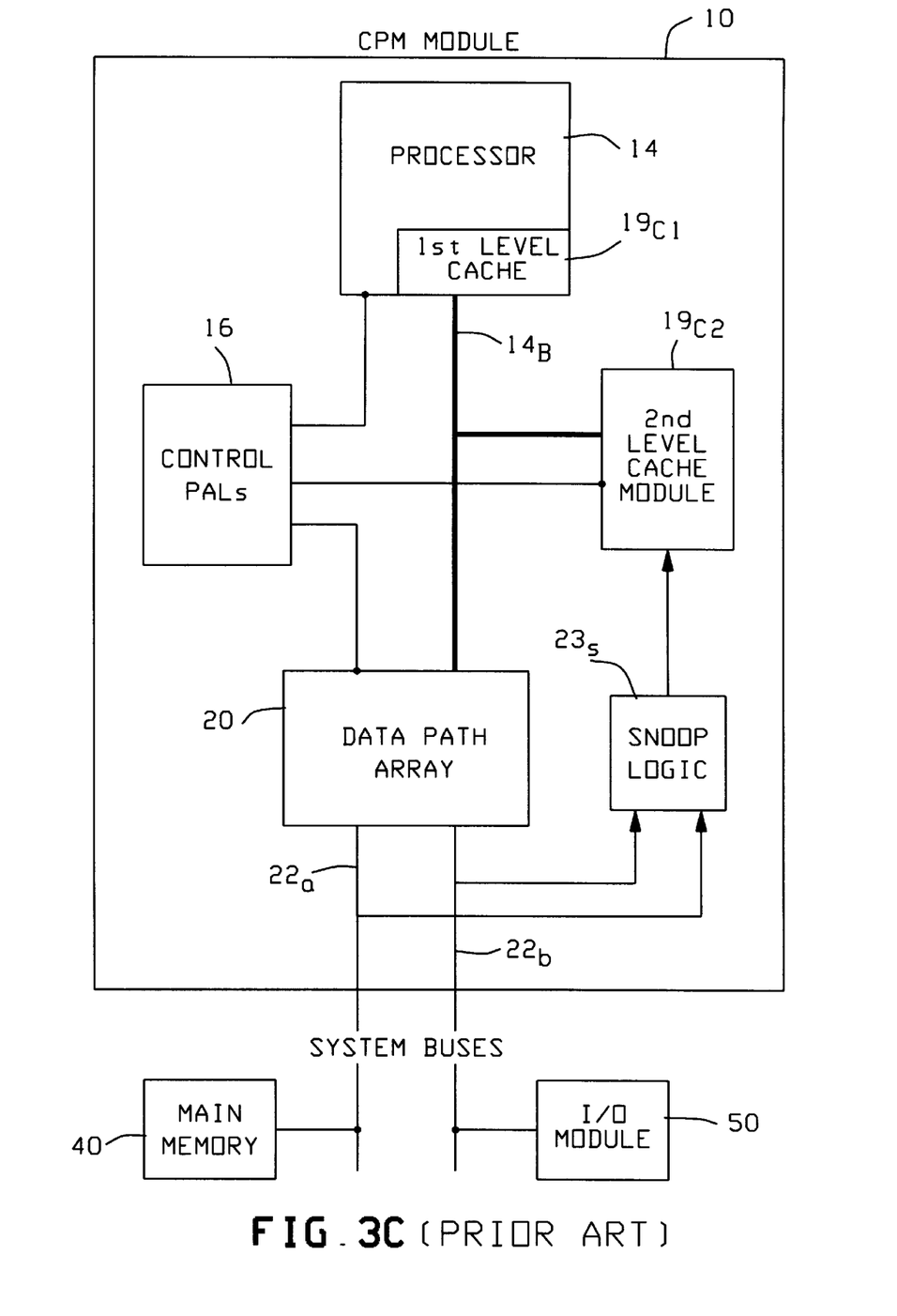
FIG. 3C is a drawing showing the detailed logic units involved in the Central Processing Module.

FIG. 3C shows the elements of the Central Processing Module 10 in greater detail. Here, the processor 14 connects to the processor bus 14b, while the processor 14 itself has its own first level cache 19c1, but then can also access, via processor bus 14b, the second level cache module 19c2. The processor bus 14b also connects through a unit designated the Data Path Array 20, if there is a requirement for access to the system busses over to main memory. Here, the cache memory module 19 of FIG. 3B is illustrated as two separate units. The first unit designated the first level cache 19c1 is shown internally to the processor 14. The second level cache module 19c2 is shown connected to the processor bus 14b.

In order to gain higher system performance, multi or double-levels of cache are often used. When the processor 14 needs memory data, the first level cache 19c1 is the first resource that the processor 14 will seek. If the first level cache 19c1 does not have the information requested, then the processor will access the second level cache 19c2 to try to see if the requested data is available. Finally, if neither one of the cache units have the data needed, then of course, a much slower cycle of action is required for the processor to access main system memory in order to get the required data. Typically, the first level cache unit 19c1 is quite small and may even be integrated into a processing chip. Then typically, the second level cache 19c2 is larger in storage capacity and will be often external to the processor unit 14 as indicated in FIG. 3C.

Also seen in FIG. 3C is a unit called the "Snoop Logic 23s". This logic monitors both system busses 22a and 22b for any operation that may modify data in any one of the memory locations, that is to say, this is typical of Write-type operations. The snoop block 23s captures the address values for all of these system bus operations (Writes), queues them up, and passes them on to the second level cache 19c2 at a convenient time for subsequent use or investigation. The snooping (or spying) function is necessary to assure data coherency in the cache structures. When the cache investigates each of the addresses that have been queued within it, it checks the cache tag unit to see if the cache currently contains a valid version of that particular memory address. If it does not contain a valid version, then that particular queued address is discarded. If the cache unit does contain a copy of the queued address, then the cache will operate an "invalidation" operation where it marks, in its cache tag unit, that locational address as "invalid".

With the multiple levels (2 levels) of cache structures as shown in FIG. 3C, there is an additional complication in regard to the "invalidation cycle process" which is added. In this case, it is necessary for the first level cache tag unit in 19c1 to also investigate each of the queued spy address values as well as the second level cache 19c2. This necessitates the transfer of all queued address values on the processor bus 14b up to and over to the processor first level cache 19c1. Thus, this requires and becomes a significant amount of extra traffic on the processor bus 14b. When the processor bus 14b is busy carrying an invalidation address, the processor 14 cannot use the bus for its real processing operations. The present system and method presents a method to reduce the processor bus traffic on bus 14b, due to invalidations, and thus to increase the amount of work that the processor can get done and increase its efficiency.

Figure 3D:
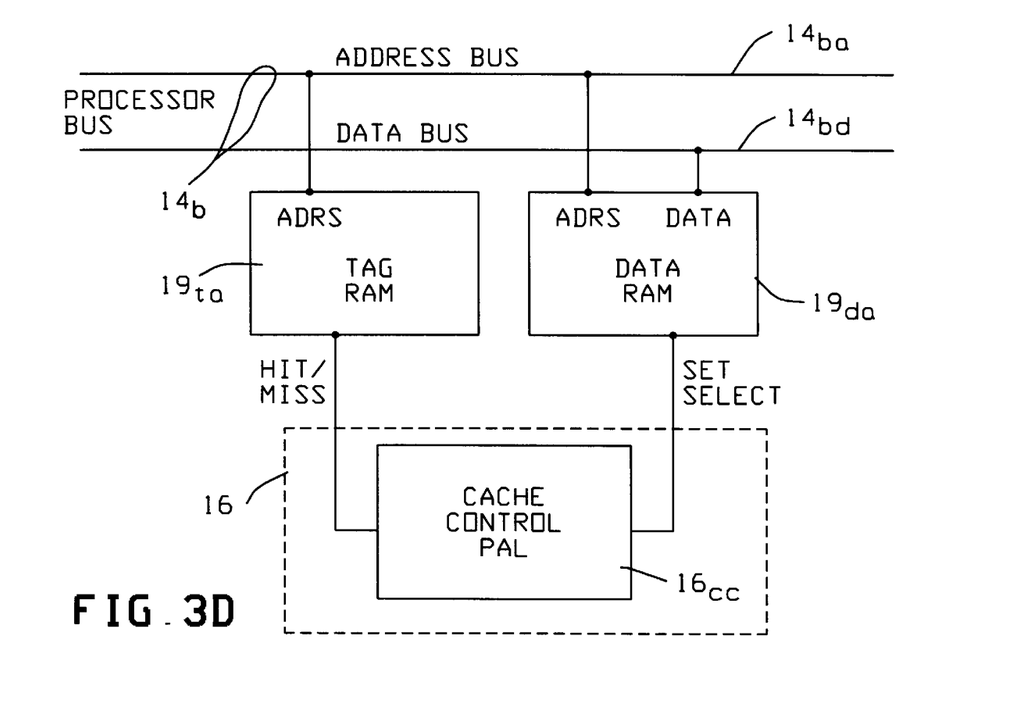
FIG. 3D is a drawing showing the various elements of the cache memory module connected to the processor bus.

FIG. 3D is an expanded view of the second level cache memory, 19c2, design to show the operative elements of a cache memory module. The processor bus 14b is made of two subordinate busses indicated as the address bus 14ba and the data bus 14bd. The cache module is shown operatively as having three major block units. These units include a Tag RAM 19ta, a Data RAM unit 19da, and a Cache Control block unit 16cc. The Cache Control unit 16cc is actually a part of the programmable array logic, Control PAL 16 which was previously seen in FIG. 3C. The Tag RAM block in all cache designs, holds the addresses, (indexes) of the data contained within the cache at any particular moment. The Tag addresses in 19ta provide the means by which comparisons of requested processor address values can be made with the held address values in the Tag RAM 19ta. When a match occurs, this is called a cache "hit", because it indicates that the cache does indeed contain valid data for that particular specified address.

The Data RAM block 19da is the storage area for all of the data held within the cache module at any particular moment. These type of Data RAMs are generally expansive and very fast operating devices which can return data to the processor on "cache hit" conditions. The Cache Control block unit 16cc, is used to monitor the Tag RAM "hit" condition, and further controls the reading out of the Data RAMs 19da. When a Tag "miss" condition occurs (i.e., not a "hit"), then this Cache Control block controls the writing into the Data RAMs 19da of any data received subsequently from the main memory 40.

SUMMARY OF THE INVENTION

A computer network users dual system busses connecting a central processing module (CPM) to a main memory and to external modules such as I/O units. The processor in the CPM uses an internal processor bus for access to a small first level cache and a large second level cache. Each of the first level and second level cache units have a tag cache for holding address index words of data in associated data caches.

Each address index word in the second level cache includes a two special status bits V and R. The V bit indicates the validity status of the data located by the address index word while the R bit is an indication to the second level cache that a corresponding tag address in the first level cache is valid or invalid in status.

A spy circuit on the system busses retrieves addresses being modified and queues them for subsequent invalidation cycles to indicate invalid addresses and data, while normally each of these snooped addresses would require use of the internal processor bus to complete invalidation cycles since the second level would require that the corresponding addresses in the first level cache also be invalidated, A major portion of this operation is eliminated since the R bit in the second level cache informs the second level cache that only the valid R=1 addresses in the first level cache have to be invalidated, that is to make V=0(V is the validity bit). Thus, rather than having the processor use its internal bus to check the first level cache for every snooped address applicable to said second level cache, it only needs to be concerned with those addresses where R=1 (i.e., valid) in the second level cache.

The system and status tracking method between the two level caches operates to keep them in "sync" since the second level cache always knows the status of address data in the first level cache with the result that all unnecessary use of the internal processor bus in eliminated thus speeding up processor operations.

DESCRIPTION OF PREFERRED EMBODIMENT

Figure 4:
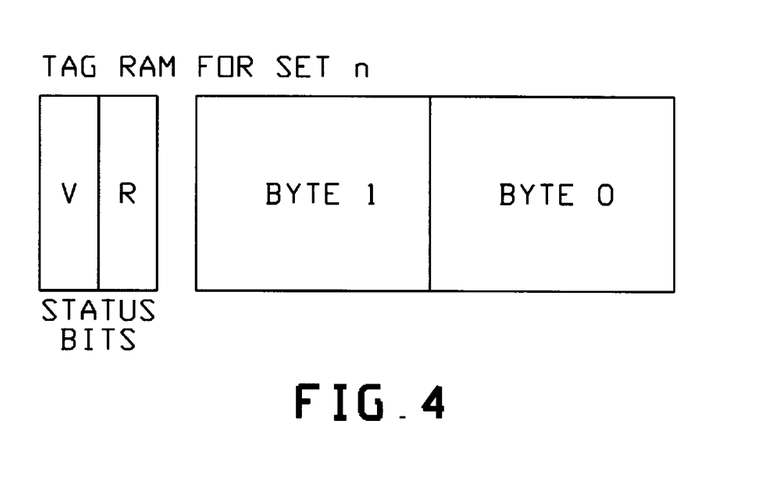
FIG. 4 is a pictorial drawing showing the values stored in a location of the cache Tag RAM unit.

With reference to FIG. 4, there is seen a schematic of the address index information in the Tag RAM 19*ta*. There are two bytes of address index information stored designated as byte 0 and byte 1. Additionally, there are two other bits designated "V" and also "R" which are the status bits. The two bytes of address index information (byte 0, byte 1) operate as a pointer index indicating what memory address the data value is currently stored in, in the Data RAM 19*da*. Each Tag RAM location also has the two bits of status "V," "R". These indicate the current state of the address index held in the particular Tag location.

Figure 5:
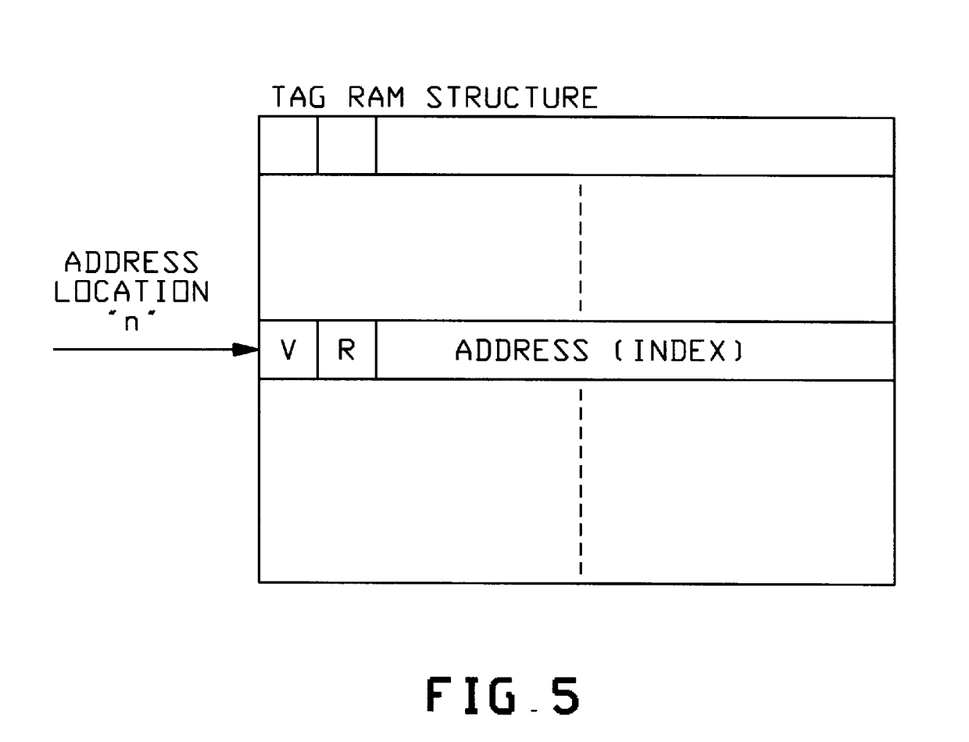
FIG. 5 is a drawing of the Tag RAM structure.

FIG. 5 is a schematic drawing of the Tag RAM structure showing different address locations "n" which indicates that, at each location, there is an address index value composed of two bytes, byte 0 and byte 1, and then additionally, each address location has the two status bits designated "V" and "R".

Valid Indicators "V" Status Bits: No matter what occurs, each location of the Tag RAM 19*ta* must provide some "status" information along with the address information that is stored. At least one bit of status information is required at a minimum by all Cache Tag structures. This normally would be a "valid" status (V) indicator. This status bit would indicate whether the address in the Tag RAM 19*ta* at that address location is a current real or "valid" address. That is to say, is there really current good data associated with this address which is held in the associated Data RAM structure 19*da*?

It will be seen, that at initialization time (when the system is first started-up), no data has yet been written into the Cache Data RAMs 19*da*. All the data is therefore "not valid". Therefore, the Tag RAM facility unit for the cache must have all of the "valid" status bits (V) in the "off" state. Then as data from main memory 40 is filled into the Cache Data RAMs 19*da*, the Tag RAM 19*ta* is also filled with the correct corresponding address information and the "valid" status bit is turned "on" (V=1) to show that this data is now considered valid and good data.

At subsequent times in the system operation, there are other system modules (for example a second processor, or perhaps another Input/Output module) may write new data into the given addresses that are currently marked as "valid" in the cache memory unit. Here, a processor circuit operation called "snooping" (or "spying") occurs and the cache unit will then turn "off" its valid status bit for that particular address location which has been changed by being written into. This process is called the "invalidation cycle". Therefore, until that cache location is subsequently re-filled with some other new data, then that location and its address is to be considered no longer valid, that is to say "invalid". Thus it is seen that, at a minimum, a "valid" type of status bit in the Tag RAM 19*ta* is required.

Multi-Cache Levels: Many systems, including the subject system described herein, have multiple levels of cache facilities. The herein described system is seen to have a first level cache 19*c*1, which is internal to the processor 14, and a second level cache 19*c*2 (FIG. 3C) which will be a major focus of the present system. The previous discussion regarding the "valid" status bit applies to each one of the two cache levels. That is to say, both the first level cache and the second-level caches will have separate "valid" status bits specifying the current state of each of their respective Tag RAM address locations. Both cache levels will also find it necessary to provide for the snooping and the invalidation processes. The present system provides a means by which the second-level cache 19c2 can greatly assist the first-level cache 19c1 in this regard. The second-level cache 19c2 provides a "second status bit" which is used to minimize the invalidation efforts required by the first level cache 19c1. In so doing, the efficiency of the processor 14 and its associated processor bus 14b is enhanced by enabling a reduction in unnecessary traffic.

Reflection Status Bit (R bit): As seen in FIG. 4, in addition to the validity bit "V", there is also seen the reflection status bit "R". This second bit of status designated as the R bit is included together with the valid bit in the Tag RAM of the second-level cache module 19c2 of FIG. 3C.

FIG. 5 shows the layout of the bits stored in the Tag RAM of the second-level cache memory 19c2. The Tag RAM structure shown in FIG. 5 is used to illustrate the address word layout, which in this particular embodiment, is 18 bits wide. This allows for 16 bits of necessary address information (8 bits of byte 0, 8 bits of byte 1) and further shows the two status bits required designated "V" and "R". The second status bit denoted as "R" shown in FIG. 5 is called the "Reflection status" bit. As was seen in FIG. 3C, the network has two levels of cache modules, and the R bit reflects the valid/invalid state of words within the first level cache 19c1.

In the present embodiment, the second-level cache 19c2 is much larger in size than that of the first level cache 19c1. The second-level cache 19c2 is a "super-set" of the first-level cache 19c1. Thus, all data held in the first level cache is also held in the second-level cache which also holds considerably more amounts of data. It is desirable in this situation, for the second level cache control logic (such as 16cc) to know whether a particular address is currently valid in the first-level cache module 19c1. The R bit status bit designated "R" provides this information. Thus, the second-level cache control logic 16cc is provided with an informative indication as to whether a particular address is currently valid in the first-level cache 19c1.

Thus, just like the valid bit "V" for the second level cache 19c2 indicates whether a specific location in the second level cache 19c2 currently has valid data, so that also the R bit indicates (to the second-level cache 19c2) whether the first level cache 19c1 also currently has valid data at that particular address location. Table I shown below, give the possible combinations of the "V" "valid status bits" and the reflection status bits (R bits).

TABLE I

Combinations of Valid Bits and Reflection Status Bits

| VALID | R bit | DESCRIPTION |
|---|---|---|
| 0 | 0 | Tag RAM location is currently NOT valid in both 1st and 2nd level caches. Location does not contain good data. This is the initial state of both caches. This condition will occur after a specific cache location has been invalidated by the snooping logic monitoring other system module activities. |
| 0 | 1 | Cannot happen—2nd level cache (VALID) always includes the 1st-level cache state. |
| 1 | 0 | 2nd-level cache at this address contains current, good, valid data, but the 1st-level cache does not contain valid data at this location. This condition will occur when the 1st-level cache has filled over previously valid locations. The 1st-level cache is much smaller |

TABLE I-continued

Combinations of Valid Bits and Reflection Status Bits

| VALID | R bit | DESCRIPTION |
|---|---|---|
| | | than is the 2nd-level cache—it can contain only a small portion of data in the 2nd-level cache. |
| 1 | 1 | Both cache levels contain current, good, valid data at the Tag RAM address location. This will occur whenever cache data is first filled into the caches. When data is first filled into the caches from main memory, both cache levels initially get the same data. Later, the 1st-level cache may need to fill-over giving the case above. V = 1, R = 1 |

In the situation in Table I, where V=1 and R=1, it should be indicated that as new data is added into the cache, on a MISS condition, the new data has to be put somewhere in the cache. It often will be put "over" current good data. This situation is called "over-filling."

With the above-provided information regarding the valid bit and the reflection bit, it will be seen that the use of the "valid" and the "R bit" status bits as used in the second-level cache module for the invalidation/snooping process, will be seen to reduce traffic on the processor 14b to the greater gain of higher throughput by the processor.

The Invalidation Cycle in the Earlier Art: With reference to FIG. 3C, in order to indicate the basic paths involved in the invalidation process, the snoop logic 23s monitors all activity on the system busses 22a and 22b, thus looking for any memory modifying operation that occurs, that is to say Write operations. For all such operations on any system bus 22a, 22b, the Snoop logic 23s will insert the address of any "Write" operation occurring on the bus, into an "invalidation queue" in the cache module.

As the second level cache 19c2 has resources which are available, addresses will be retrieved from the invalidation queue and then tested against the second level cache Tag RAM for possible compares to see if a match occurs. If a queue address value is currently in the Cache Tag RAM 19ta (FIG. 3D), and the "valid" status bit for the location is "on", then the second level cache 19c2 does actually contain that data value and it must now be marked as invalid, that is to say, the valid status bit is "turned off", (V=0).

Without the Reflection bit R bit, of the presently described system, which was not used in prior art, then at this point all "valid" addresses from the invalidation queue (in the snoop logic, 23s, FIG. 3C) would have to unconditionally be transferred onto the processor bus 14b over to the processor 14 to be tested and then invalidated in the first-level cache 19c1. Such an activity as this puts an additional traffic load on the processor bus 14b. It should be noted that the processor bus 14b is the processor's lifeline to the outside world for all of its activities. This processor bus 14b takes care of all processor Writes to memory, the sending and receiving of messages, and the reading of memory for first level cache module "misses". When the addresses for the invalidation cycle are added to this mode of traffic on the processor bus 14b, it will then have some considerable deteriorating performance impact.

In the earlier art, it was seen that all addresses that were found to be "valid" in the second-level cache 19c1, had also to be transferred up to the first level cache 19c1 for possible invalidation after a snooping operation. It must be remembered, however, that the second-level cache 19c2 is much larger in size than is the first-level cache. As an example in the Unisys A11-1011/1211 systems, the first-level cache is only 1K words deep, while the second-level cache is 64K words deep, which is a considerable size difference. Therefore, it may be seen that many, many extra addresses that are valid in the second-level cache 19c2 are unnecessarily transferred up to the first-level cache 19c1 (to check for a match address and subsequent invalidation action), which of course, will not be valid in the first level cache.

It is estimated that about 10% of all system bus operations (Writes) will be valid in the second-level cache. It is further estimated that about 10% of these (1% of system bus Writes) will also be valid in the first-level cache. From these operating estimates, it may be seen, that under the earlier art, 90% of the address values that are transferred onto the processor bus 14b, are unnecessary, that is to say, they will not be valid in the first level cache module.

Figure 1:
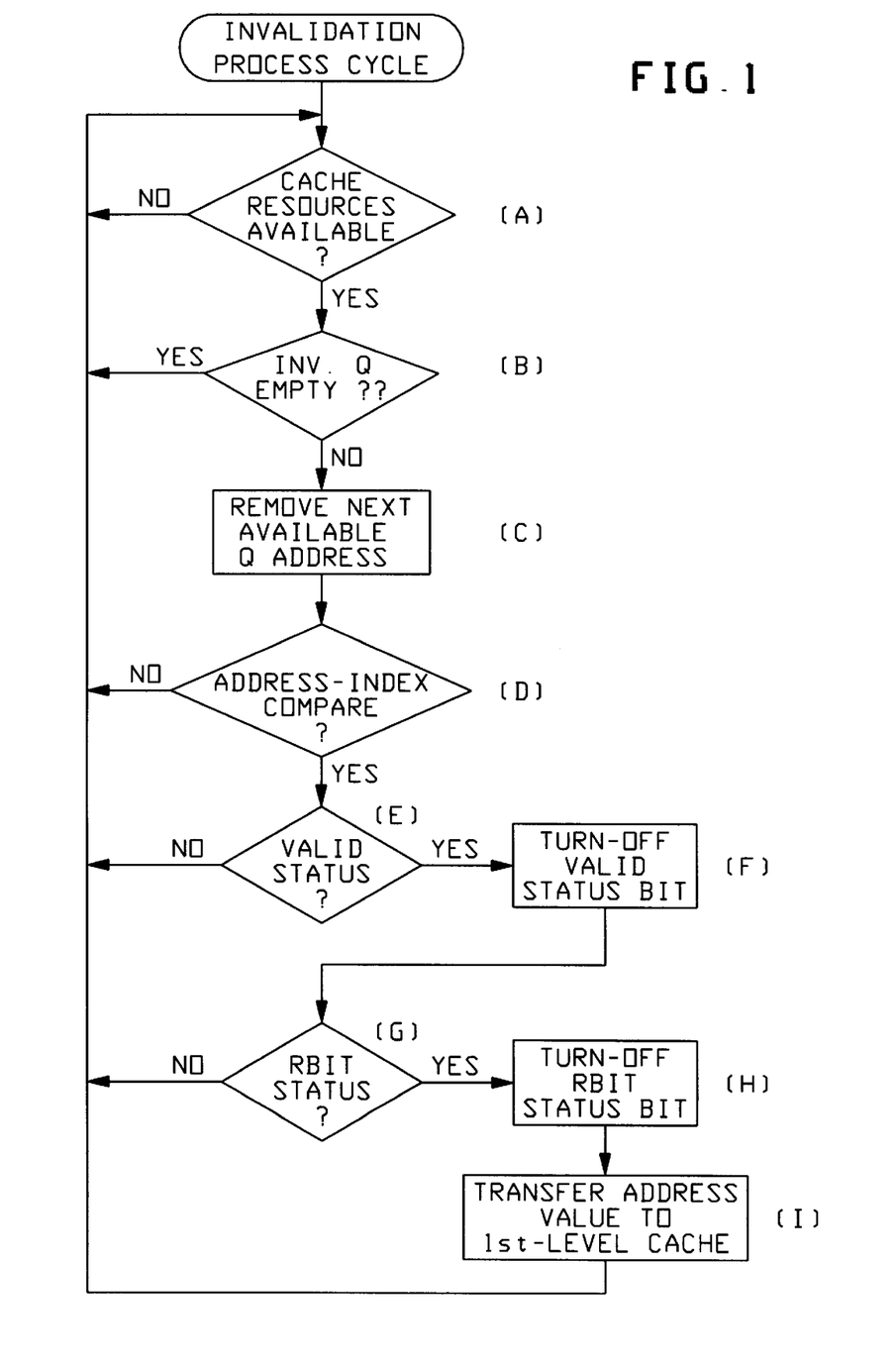
FIG. 1 is a flow chart indicating the steps involved in an invalidation cycle with use of a newly added reflection status bit (R bit)
Figure 2:
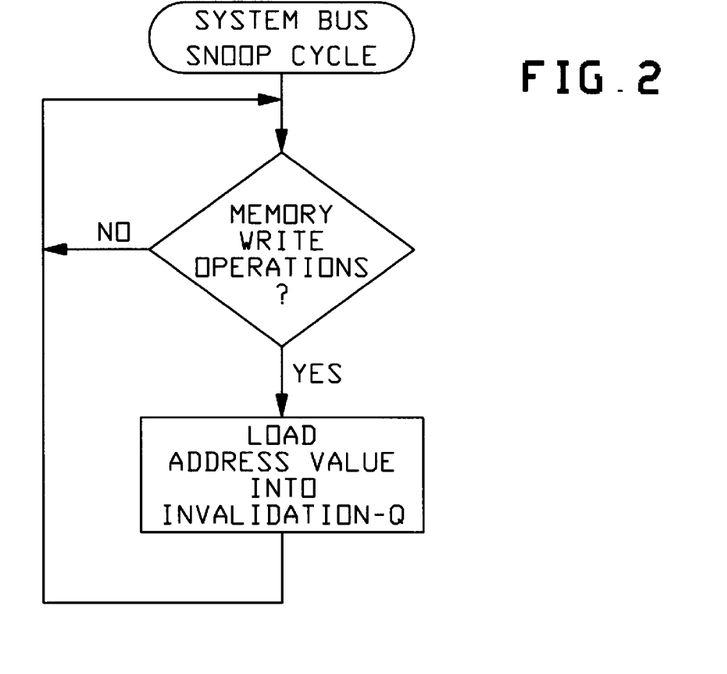
FIG. 2 is a flow chart of the system bus snoop operation.

The Invalidation Cycle—Improved Method: FIGS. 1 and 2 show flow charts which are involved in the method and system provided in the present network. The flow chart of FIG. 2 indicates the Snooping function where addresses for system bus "Write" operations are put into the invalidation queue for later retrieval. This type of operation and sequence of steps has been used in earlier art and is also used in the present method.

FIG. 1 is a flow chart indicating the steps involved in the invalidation process with the added utilization of the Reflection Bit (R bit). As seen in FIG. 1, addresses are taken out of the invalidation queue and tested against the address (index) and the valid status bit stored in the second-level cache Tag RAM 19ta. The earlier art used steps A, B, C, D, E, and F, as seen in FIG. 1. In the earlier art, all addresses that are found to be valid in the second-level cache module 19c2, are unconditionally transferred up to the processor bus 14b for first-level cache testing.

In the new and improved system and method described herein, FIG. 1 can be seen to include further steps (G), (H) and (I) shown in the shaded areas. These functions add the usage of the R bit status value in the second-level cache Tag RAM 19ta. The R bit is investigated when the "valid" condition has been found. If, and only if, the R bit is also "true," R=1 (a much smaller percentage of the time), then will that particular address value be transferred up to the processor first-level cache 19c1 for testing. On the other hand, if the R bit is "false," R=0 then this indicates that there is no need to transfer the address value to the first level cache for testing purposes thus freeing the processor bus 14b.

As will be seen in FIG. 1, when the valid condition is found (E), then the valid status bit will be turned "off " (F) and this will complete the invalidation cycle. But then additionally, in FIG. 1, when the R bit condition is found by using the new system, and then the address is transferred up to the first-level cache module, then the R bit status in the second level cache is turned "off", R=0. This is seen at the level (H) of FIG. 1. Thus, in the new system, all addresses that will be sent up to the processor's first-level cache unit 19c1, will be invalidated in the first-level cache (no unnecessary addresses will be sent). This is known because the R bit is a direct reflection of the "valid" bit "V" in the first-level Cache Tag RAM 19ta.

Thus, the invalidation process cycle will first see if a cache module is available. If so, (yes) then at level (B) the system queries to see whether the invalidation queue is empty or has addresses in it. If it is not empty, then the next available address in the queue at level (C) is sent to be compared at (D) with the addresses in the Tag RAM 19ta. If an address match occurs, then at level (E) a query is made as to whether the address is valid. If it is valid, then at (F) the system will turn off the valid status bit so that V=0. This completes the first part of the invalidation cycle. However, the entire invalidation cycle is not fully complete until any addresses in the first level cache are investigated. So in this regard going from (F) to (G) of FIG. 1: if the R bit is "on" (yes) where R=1, then the system will turn off the reflection status bit to R=0 and then transfer the address value from the second-level cache to the first level cache for completion of the invalidation cycle at (I).

The R bit exactly reflects the status of the first level cache (19c1) valid bit. Thus, if R=1 for a given address, it will be seen that the first level cache valid bit=1. When the address is sent up to the first level cache (19c1), it will be invalidated so that then the first level cache valid bit=0. Thus, the R bit will show R=0 to reflect this situation of invalidity.

R bit Updating Logic: As was previously indicated, the Tag RAMs (19ta) for both of the cache modules 19c1 and 19c2, must be initialized at start-up time such that all of the "valid" status bits "V" are turned "off". Likewise, for the second level cache module 19c2, the value of the Reflection bits, "R" must all be turned "off" to reflect that state of the first-level cache modules "valid" status (which at this time is "off").

From the initial "off" (=0) state, the "valid" bit values will be turned "on" and also "off" (=0) in the course of operations. The R bits must be made to follow the associated "valid" bit "V" value in the first-level cache 19c1. The types of operations that can affect the status bits are indicated and described hereinbelow.

(1) FILL PROCESS: This occurs when a cache has a "miss" condition on a Read operation.

Then when the "miss" data is loaded from outside that cache into the cache data RAMs 19da, the "valid" bit value associated with that location is turned "on". The associated address (index) is also loaded into the Tag RAM at that location. When a Fill takes place, the cache logic 16cc must pick an appropriate location within the cache module to fill-in the data. In a multi-set cache system, this means it has to pick which one of the multiple RAM sets to fill-in the data.

(2) INVALIDATION CYCLE: The invalidation cycles will take place as memory "Writes" occur on the external system busses 22a, 22b as initiated by other system modules. The address values involved are queued-up and then tested against the Cache Tag RAMs 19ta. If the address involved is found to currently be in the cache module, then that location must be invalidated, that is to say the "valid" status bit must turned "off", V=0.

In systems where there are two levels of cache modules such as seen in FIG. 3C, then the (1) fill process and the (2) invalidation cycle become extremely complicated. For example, when the first-level cache 19c1 is doing a FILL operation, it may be getting filled from the second level cache (19c2) directly, that is to say, from a second-level cache "hit" or it may be getting filled from the main memory 40 via the second-level cache 19c2 which occurs after a second-level cache "miss".

Additionally, since the first level cache 19c1 is quite small compared to the second-level cache 19c2, the first level cache must do many more FILLs over the top of previously good, stored data, and it has to pick someplace to put the next incoming data. When a cache module does an "overfill", then the previous data held at that location of the cache module is lost, and must subsequently be read from the Main Memory 40 when there is cache "miss". In the presently described system, the first level cache 19c2 provides a special command over the processor bus 14b onto the second-level cache 19c2 whenever the first level cache is doing a FILL-over operation. This special command is called "LRUTAG and gives the address value that was previously held valid in the cache location that is to be over-filled. The second level cache 19c2 can use this information to adjust the Reflection bit "R" associated with the previously held address value, since the first-level cache 19c1 will no longer hold a valid copy of that data.

The exact type of situation occurs when the second level cache 19c2 must do an Over-FILL of previously held data where the Reflection bit was "on" (R=1). Here, the second-level cache 19c2 will send up to the first-level cache 19c1, the address value that was previously held in the cache, that is to say, at the location that was being over-filled. The first-level cache 19c1 will invalidate its copy at this location, and this keeps the first-level cache in "sync", that is to say, an exact sub-set of the second level cache module. (19c2).

In this situation where two levels of cache are operative in the system and it is necessary to function with the fill process and with the invalidation cycle process, there are a number of situations which can occur in which there will be a great use for the valid bit "V" and also for the Reflection bit R bit. These various situations are enumerated hereinbelow as S1, S2, S3, S4, S5, S6, which refer to various types of situations.

Figure 6A:
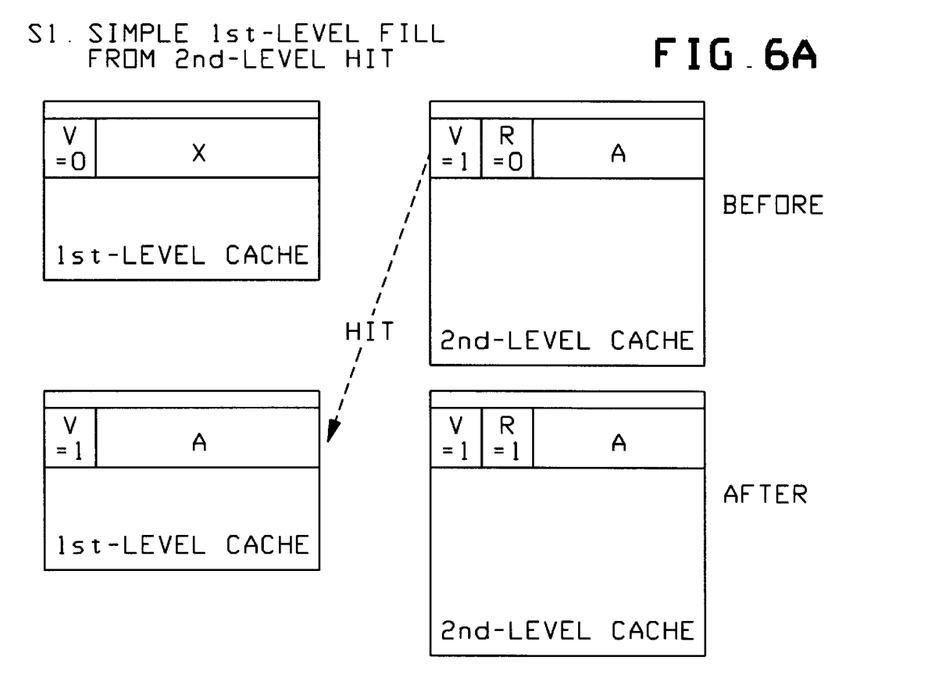
FIG. 6A is a drawing illustrating the simple first-level fill from a second-level cache hit.

S1. Simple First-Level FILL from Second-Level HIT (FIG. 6A): The processor 14 does a Read operation to address "A". The First-Level cache has a "miss". The Second-Level cache has a "hit" and will return data for address "A" to the first level cache. After the transaction is completed, the first-level cache valid bit "V" is set (V=1) for address "A". The second-level cache "V" bit continues to be set=1 and the R bit for address "A" is set=1 to reflect the fact that the first level cache has been given data for address "A". This is seen with reference to FIG. 6A.

Figure 6B:
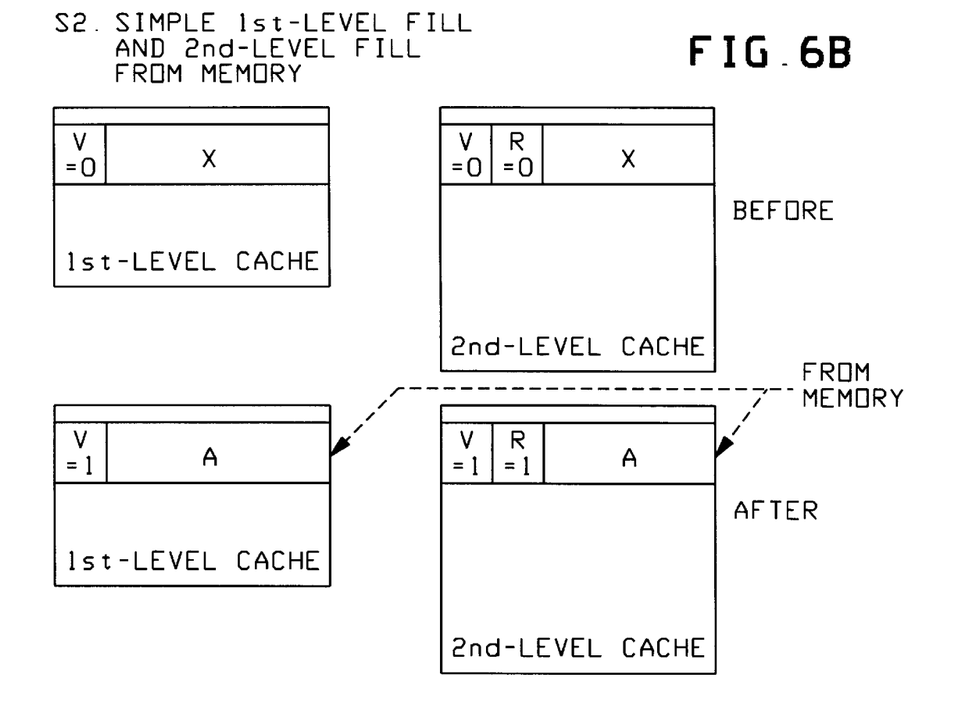
FIG. 6B is an illustration of a simple first-level fill and a second-level cache fill from main memory.

S2. Simple First-Level FILL and Second-Level FILL From Memory 40 (FIG. 6B): The processor 14 does a Read operation to address "A". The first level cache and the second level cache each have "misses". Data will be returned to both caches from the Main Memory 40 for the address "A". After that transaction is completed, the first-level cache valid bit "V" is set=1 for the address "A". The second-level cache valid bit "V" is set=1 because address "A" now has valid data. The Reflection bit (R) for address "A" is set=1 to reflect the fact that the first level cache 19c1 has been given data (valid) for the address "A".

Figure 7A:
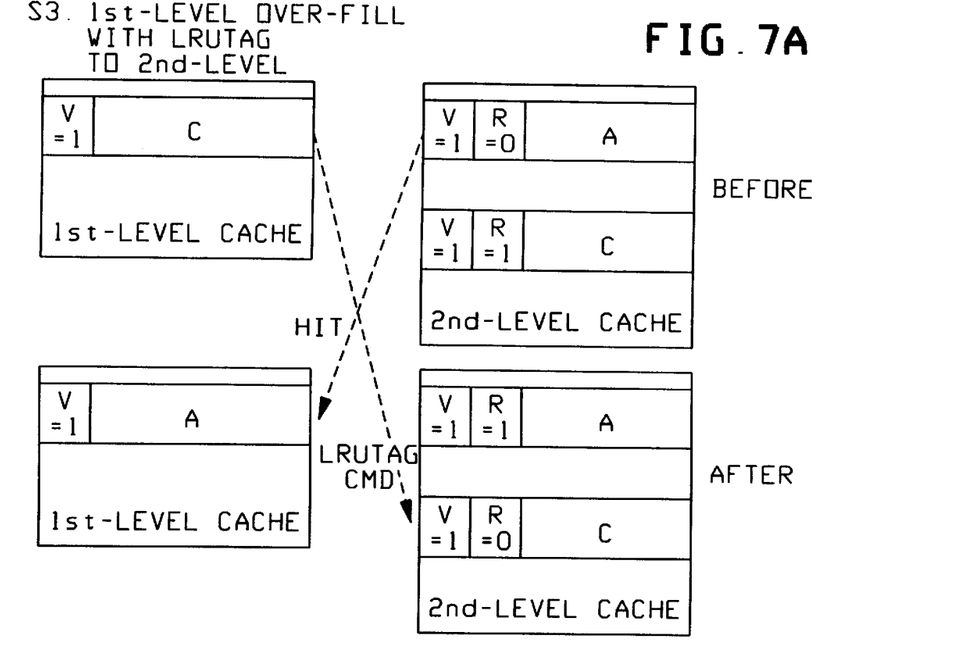
FIG. 7A is an illustration of a first-level cache over-fill with a special command LRUTAG over to the second-level cache.

S3. First Level OVER-FILL With LRUTAG Command to the Second-Level Cache (FIG. 7A): The processor 14 does a Read operation to the address "A" for use of the the processor. The first-level cache has a "miss". The second-level cache has a "hit" and will return data for address "A". The first-level cache will over-fill its location which currently contains the address "C" by overwriting with the incoming "A" address information. Therefore, the first-level executes a LRUTAG command to tell the second level cache about the "C" location in 19c1 and that it is not being valid any longer. After the transaction is completed, the first-level cache "V" bit is now valid=1 for address "A" at the location that used to hold "C" data. The second-level cache "V" bit for address "A" continues to be valid=1, while the R bit for address "A" is set reflecting the fact that the first level cache now also has this as valid data, thus R=1. The second level cache also uses the LRUTAG command information to mark the R bit for the "C" address as "off"=0(i.e., R=0), thus reflecting the fact that the first level cache no longer owns data for the address "C", since it has been over-filled by "A" data.

Figure 7B:
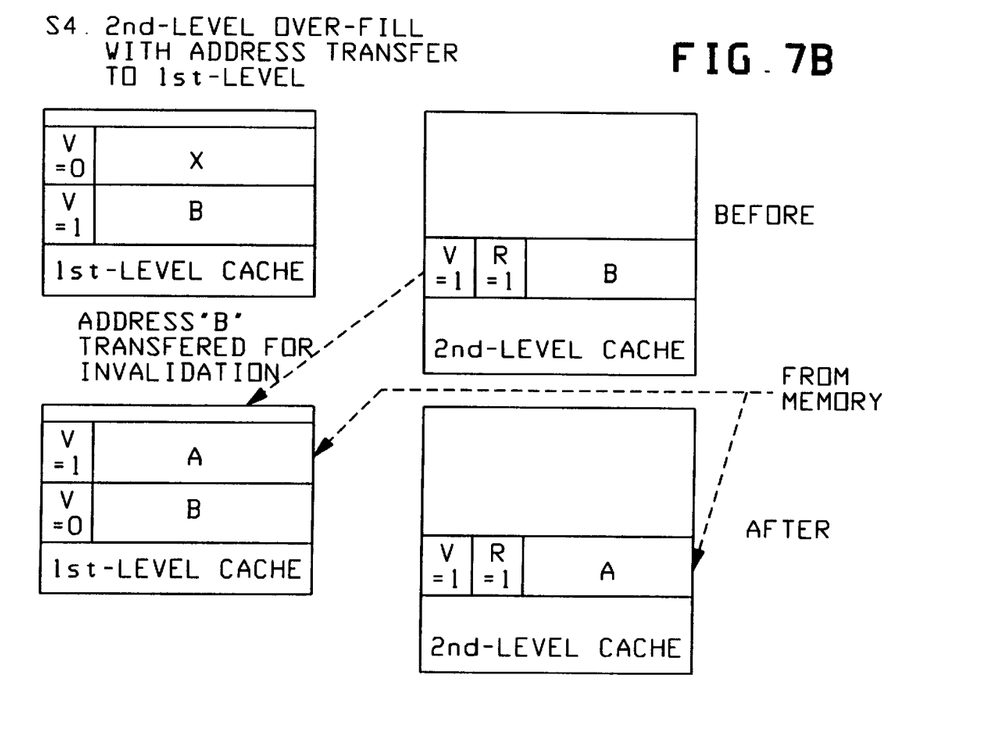
FIG. 7B is an illustration of a second-level cache over-fill with the address transfer to the first level.

S4. Second Level OVER-FILL With Address Transfer to First Level Cache (FIG. 7B): The processor 14 does a Read operation to the address "A". The first-level and the second-level caches have "misses," so that data will be retrieved from Main Memory 40. The second-level cache must over-fill its location currently containing address "B" with the incoming "A" information. Since the R bit is valid=1 for the "B" location, the second-level cache will transfer up to the first level cache, the "B" address for invalidation within the first level cache thus to make V=0 for B. After the transaction is completed, the first-level cache valid bit "V" for the "A" address is valid=1 since this new data has been received from main memory 40. Further, the first-level cache module has invalidated its location previously holding the "B" address data by turning off the valid bit for "B"so that V=0. The second-level cache has over-filled the location previously holding "B" data with the "A" data, and the second-level cache has marked the location as valid in both cache levels by setting the valid bit V=1 and the Reflection bit R=1 for the "A" address.

Figure 8A:
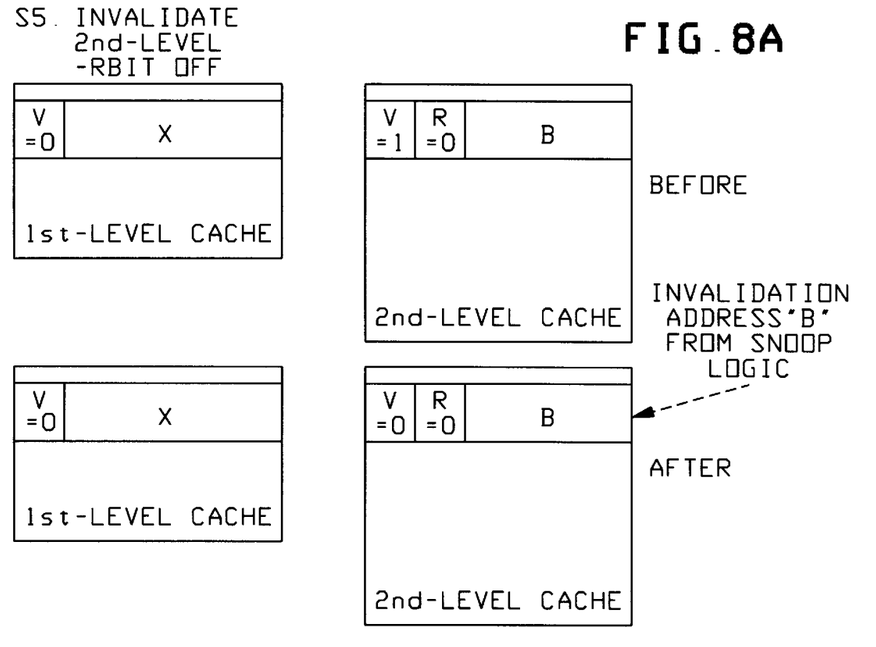
FIG. 8A is an illustration of invalidation occurring in the second level cache with the reflection status bit off.

S5. INVALIDATE Second-Level—R bit Off=0 (FIG. 8A): The Snoop logic 23s monitoring the system busses 22a, 22b, has sent the address "B" to the second-level cache 19c2 for a possible invalidation. Since the second-level cache currently contains a valid copy of "B" it does an invalidation operation by turning "off" the valid bit "V"=0 for the "B" address. Since the R bit was "off"=0 for "B" indicating that the first-level cache currently does not contain "B" data, the second-level cache does not transfer address "B" up to the first level cache for its invalidation. This is a special feature of the present system, and this is the most general case. Much unnecessary traffic on the processor bus 14b is saved by the use of the R bit (Reflection Bit). After the invalidation process cycle is completed, the second-level cache 19c2 has turned "off" the "V" bit=0 for "B" indicating that the address "B" is not valid. The first-level cache has taken no action since the second-level cache, by using the R bit (R=0), has saved the second level cache (from sending an invalidation address to the first level cache) and obviated any unnecessary work on using the processor bus, 14b.

Figure 8B:
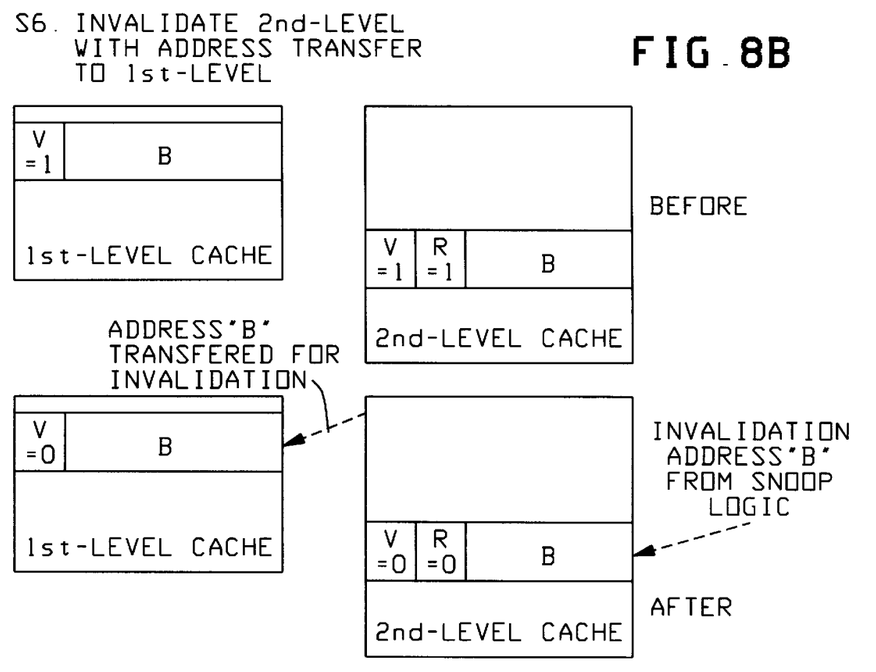
FIG. 8B is an illustration of an invalidation to the second-level cache with an address transfer to the first-level cache.

S6. INVALIDATE Second-Level With Address Transfer to First-Level Cache (FIG. 8B): The Snoop logic 23s (FIG. 3C) monitoring the system busses 22a, 22b has sent an address "B" to the second-level cache for a possible invalidation. Since the second-level cache 19c2 currently does contain a valid copy V=1 of "B", it then does an invalidation by turning off the valid bit "V" (V=0) for the "B" location so V=0. Since the R bit was also "on" (R=1) for location "B", the second level cache 19c2 transfers the address "B" up to the first level cache for its invalidation cycle also. After the invalidation process cycle is completed, the second-level cache 19c2 has turned "off" both the valid bit "V" and the R bit, thus "R"=0 for the location "B", indicating that location "B" is not valid in either cache level 1 or cache level 2. The first-level cache module has turned "off" the valid bit "v" for location "B" also, thus indicating that location "B" is no longer valid there either, V=0.

The situation S5 shown above is indicative of the great savings of the presently-described system and method, since any unnecessary address transfer over the processor bus 14b is saved. Thus only in cases where the Reflection Bit (R=1) is "on", will addresses be transferred up to the first-level cache 19c1. Statistically, approximately 10% of all snooped write operations on the system busses 22a, 22b, will be valid on the second-level cache 19c2. Of this 10%, further only 10% of those will be valid also in the first-level cache 19c1. Thus, when invalidation cycles are required, it should be seen that this system and method will save a tremendous amount of wasted traffic, time and effort for the first-level cache logic 19c1. Without the Reflection Bit R bit, all of the Snoop Write operations for addresses to be invalidated in cache (100% of them) would have to be investigated by the second cache, and at least the full 10% valid ones would also have to be transferred up to the first-level cache Tag RAMs 19ta for possible invalidation cycles. However, by using the Reflection Bit "R" in the second-level cache 19c2, then only approximately 1% of all system bus Write operations have to be transferred up to the first level cache 19c1 for invalidation cycles. In a busy, multiple processor system, the 9% savings on processor bus traffic is a major efficiency improvement.

Processor Bus Transfers (on Bus 14b): As was indicated in FIG. 3C, the processor operations of the processor 14 will occur as a first search onto the first-level cache 19c1 where, if there are Read "misses", the processor bus 14b will be used to search into the second-level cache module 19c2. Likewise for all Write operations, the processor 14 will use the processor bus 14b out to the second-level cache or possibly over the system busses 22a, 22b to the Main Memory 40 or I/O module 50. There are very few control signals necessary for the control operations on the high-speed processor bus 14b. The pertinent signals involved with the processor bus 14b are indicated in the attached Table II.

TABLE II

Signals on Processor Bus 14b

| SIGNAL NAME | DESCRIPTION |
| --- | --- |
| RCMEMCMDVLD (from processor) | Signal indicating that a memory operation command is active on the processor bus, 14b. |
| RCMEMDCMD(3:0) (from processor) | 4 bits encoding the memory commands out of the processor. The commands important to this system are:<br>READ4 = 1000<br>READ2 = 1001<br>WRITE = 0100<br>LRUTAG = 1110 |
| RCMEMCMDACK (to processor) | Signal indicating to the processor that the memory command on the processor bus has been accepted and is in progress. |
| RCMEMDATVLD (to processor) | Signal indicating to the processor that read data is available on the processor bus, 14b. |
| RCENDREAD (to processor) | Signal indicating to the processor that the final word of read data is on the processor bus. |
| RCADRDRV (to processor) | Signal to the processor allowing it to drive onto the address 14ba portion of the processor bus. |
| RCDATDRV (to processor) | Signal to the processor allowing it to drive onto the data portion 14bd of the processor bus. |
| RCIADRVLD (to processor) | Signal to the processor indicating that a transfer address in on the processor bus for investigation by the 1st-level cache for possible invalidation. |

Figure 9A:
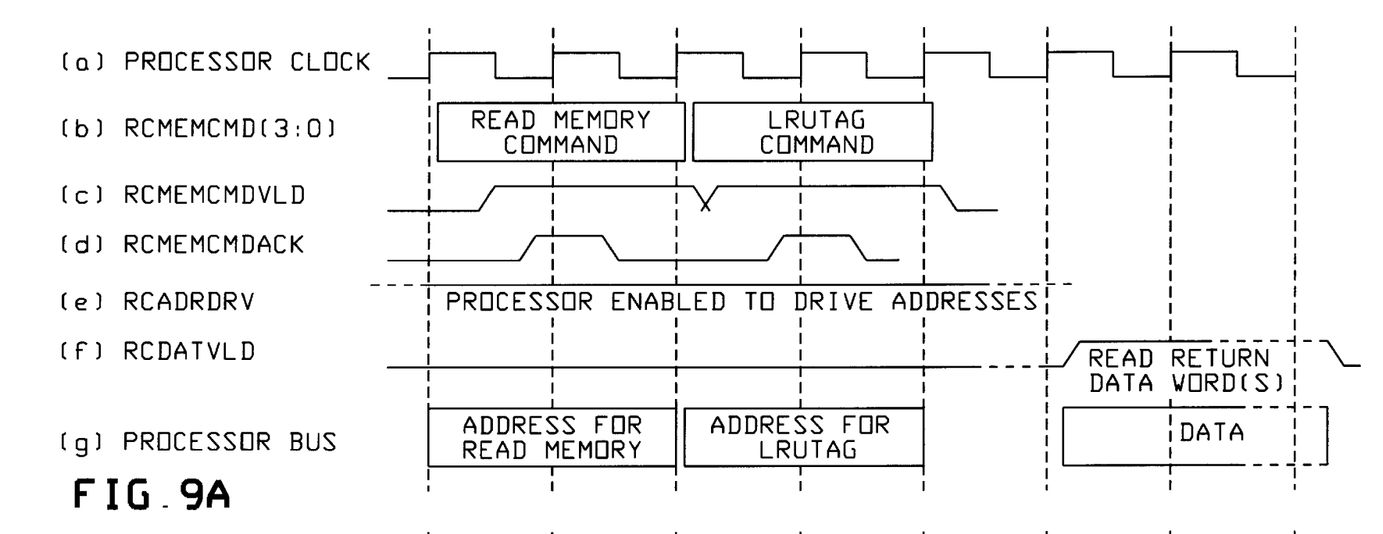
FIG. 9A is a timing diagram showing the basic timing for a processor, first-level cache read operation on the processor bus.

FIG. 9A is a timing diagram showing the basic timing for the processors first-level cache Read operation on the processor bus 14b. It may be noted in line (b) that after the Read memory command, there is a LRUTAG which, when necessitated by the first-level cache module, takes only two clock periods and is substantially hidden, since it occurs while waiting for the Read operation data to be returned.

Figure 9B:
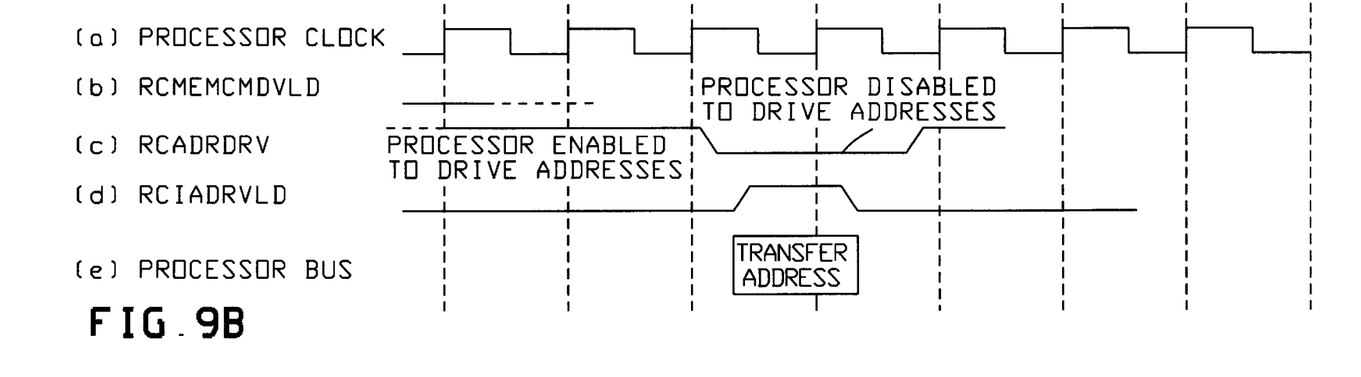
FIG. 9B indicates the basic timing for address transfers back to the first level cache from the second level cache.

FIG. 9B shows the basic timing drawing for address transfers back to the first level cache 19c1 from the second-level cache 19c2. These occur for either an invalidation cycle, where the R bit "R" is "on"=1 or for when the second-level cache over-fills where the R bit is "on". It may be noted that the transfer operation for transferring the address takes only one clock time, but two clock times are lost to the processor bus 14b because of the need to turn the drivers around. The signal RCADRDRV on line (c) of FIG. 9B is used to allow the processor 14 to drive the address portion 14ba of the processor bus 14b. Thus, it will be seen that every time that this efficient feature using the "R" Response Bit, operates to prevent an unnecessary address transfer on the processor bus 14b, it saves two clock periods which is then available to the processor 14 for its own private usage.

Described herein has been a system and method which allows a computer network to use a Central Processing Module having multiple cache levels and still enable the optimization of traffic on the processor high-speed bus. A specialized Reflection Bit, R bit coordinated with the "V" valid status bit, comes virtually free in this system, since the second-level Cache Tag RAM 19ta module has an extra status bit which is unused.

The chip used for the Tag RAM, 19ta (Cyprus Semiconductor Types CY7B181, San Jose, Calif.) provides for 18 bit storage per word. since 16 bits are used for the address-index and one bit is used for the Valid bit, this leaves one bit (normally unused) to be available for the R bit.

The Reflection Bit "R" is controlled and monitored by the second-level Cache Control Programmable Array Logic 16cc, and is implemented by merely using extraneous spare gates which are available within the programmable array logic of the Control PAL 16 of FIG. 3D and also in FIG. 3C. The system presented herein is relatively simple and very inexpensive to implement, since it can be implemented virtually free into the existing hardware of the system. Further, it enhances the cache hit rate by 5–10% without need for including any extra hardware.

While one preferred embodiment of the improved system and method has been illustrated, it should be understood that the invention is defined by the following claims.

What is claimed is:

1. In a network holding a central processor having a processor bus connecting first and second level cache units and having a snoop logic unit to sense any changes in address data appearing on a system bus, said first and second level cache units controlled by a single Programmable Logic Array unit having snare unused gates, a method for keeping said first level cache and said second level cache units coherently synchronized while minimizing the load on the interconnecting processor bus, comprising the steps of:

(a) initiating a system bus snoop cycle to retrieve addresses of data being modified;

(b) loading said addresses in an invalidation queue for use in subsequent invalidation of addresses in said cache units;

(c) providing status bits v and R for each address in said second level cache unit, to indicate validity V=1, invalidity V=0 and to indicate, in said second level cache unit, that said first level cache unit has a valid copy of each address when R=1 and no valid copy of each address when R=0;

(d) formulating said second level cache as multiple units greater in size than said first level cache so that all data in said first level cache resides in said second level cache but said second level cache holds much larger amounts of information than said first level cache;

(e) utilizing said snare gates in said Programmable Logic Array unit as a single cache controller for said first and second level cache units;

(f) invalidating, V=0, each address in said second level cache unit, when an address, received from said system bus snoop cycle, matches an address in said second level cache unit;

(g) checking the R bit status value when an address from said system bus snoop cycle matches the address in said second level cache unit;

(h) turning off, (R=0), when said R bit status value for said address in said second level cache unit is R=1, to render R as invalid, V=0, said turned-off R bit, R=0 indicating that no valid copy of said address, received from said system bus snoop cycle, is stored in said first level cache unit;

(i) transferring said address, received from said system bus snoop cycle to said first level cache unit for a match to invalidate, V=0, any matching address in said first level cache unit.

2. The method of claim 1 including the steps of:

(j) utilizing, on a cache memory Write operation, an LRU fill algorithm on said first level cache unit to place new data therein.

* * * * *